Feb. 23, 1971  Z. CSISZAR  3,564,853
METHOD OF CONTROLLING EROSION ON SEASHORES
Filed March 24, 1969

United States Patent Office 3,564,853
Patented Feb. 23, 1971

3,564,853
METHOD OF CONTROLLING EROSION ON SEASHORES
Zoltan Csiszar, 96 Walpole St., Merrylands,
New South Wales 2160, Australia
Filed Mar. 24, 1969, Ser. No. 809,839
Int. Cl. E02b 3/04
U.S. Cl. 61—5                10 Claims

ABSTRACT OF THE DISCLOSURE

The invention relates to methods of and appliances for preventing the erosion by wave action of foreshores of large expanses of water. The appliances comprise flexible curtains of fine mesh placed below the water level in the path of incoming waves in the large expanses of water. Sand or sediment is allowed to build up on one side or the other of the flexible screens.

BACKGROUND OF THE INVENTION

Field of the invention

The present invention provides a method of controlling erosion of and sedimentation on the foreshores of large expanses of water using flexible screens. The flexible screens, after having been positioned, can be adjusted, re-arranged or completely removed at comparatively little cost.

DESCRIPTION OF THE PRIOR ART

Breakwaters located close to the shore and extended to or above the water level are exposed to the destructive power of the storm waves.

An effective method for preventing erosion of the shore would be the construction of huge off-shore breakwaters, however, the prevention of erosion alone would not warrant such an expensive procedure.

Waves travel by pressure. In a wave, the vertical threads of water move in an oscillatory way, like the stalks of a corn field would move if hit by the wind. The forward and backward motion of the water particles just over the bottom is unsymmetrical. The forward motion is stronger and of shorter duration than the backward motion. The carrying capacity of fluid in motion for suspended solid matter is proportional to the velocity of the fluid. The mass transportation of sand by the waves is caused by the unsymmetrical motion of the water over the bottom of the sea. Where the velocity of the agitation in the region of the bottom is reduced, depositing of the suspended solid matter takes place.

According to nature, the best protection against erosion of the shore is a wide beach which causes the waves to break and to dissipate their energy before attacking the land. When an ordinary stable wave approaches a shoaling beach, the ratio between wave height and wavelength increases until, at a height of about one-seventh of the wavelength, the wave breaks and its energy is ejected. It is generally accepted that a wave will break in water depth of 1.28 times its height. The wavelength and the wave velocity decreases and the wave height increases with decreasing depth, but the wave period remains the same at all depths.

Wave action is the most severe between 15 ft. below low water level and mean sea level. In exceptionally bad weather the power of the waves is enormous. It is recounted that wild sea picked up two stone blocks of 8 tons and 10 tons weight and landed them on the parapet of the breakwater, 21 ft. above high water level. Stone blocks of 9 tons weight were washed up from the top side of the rubble mount, 45 ft. below the top of the breakwater, and thrown into the harbour. Pressure intensities up to 3.5 tons per sq. ft. were recorded.

Attempts to prevent erosion by constructing sea-walls on the shore-line have proved themselves satisfactory up to a certain magnitude of wave action only. Where the wave pressure surpassed this maximum, the sea-walls collapsed due to the erosion of the foundation of the walls. Only a reinforced concrete or stone sea-walls on rock pile foundation sunk to rock would withstand without damage the pressure of huge waves.

The profile of the sea bed generally shows several closely parallel lines of major sand banks. These sand banks have been formed by the undertow of major storms in positions where the undertow met the oncoming waves. The first sand bank from the shore is the product of the latest major storm. The following sand banks in succession have been formed by progressively stronger storms. Between the first sand bank and the shore-line small ripples of sand may be found. These ripples are formed by long waves with small amplitudes. It has been observed that, after a major storm the first sand bank might have moved considerably closer to the shore and the small ripples have disappeared. Long waves with small amplitudes nourish the beaches, short waves of storms with high amplitudes deplete the beaches and erode the foreshore land.

Nature itself, as a rule, creates sand banks which act as breakwaters along surfing beaches and reduce to some extent the energy of waves. It is in accordance with nature that any attempt to protect the shore against erosion should be carried out in deep water far enough from the shore to allow the waves to break before reaching the land.

The protection to be expected from a submerged sand bank, unless such a bank has considerable width, depends on the depth of the crest of the bank. If the depth is twice the height of the oncoming wave, there will be broken waves, and the surge will blanket a level band of water for two wavelengths before reforming in deep water to a height just half the height of the original wave. An under-water sand bank, even in considerable depth, throws back the layers of water which are oscillating beneath its crown, thus reducing to some extent the energy of the wave. As the peak of the energy is at the top of the wave and the energy diminishes with the depth in geometrical progression, the reducing capacity of the sand bank also diminishes rapidly with the depth of its crest.

SUMMARY OF THE INVENTION

The object of the invention is to provide flexible screens secured to the bottom of the sea at a considerable distance from the shore-line in deep water for the purpose of trapping the drifting sand on the sea-floor in order to create sand bars with wide shoaling beaches where the complete dissipation of the storm waves may take place without the waves reaching the foreshore land to be protected. The flexible screens being in deep water and offering no resistance to the pressure of the oncoming waves cannot be destroyed by the enormous power of the wild sea.

The invention provides two types of flexible curtains to control the movement of drifting sand: the breakwater-curtain and the groyne-curtain types. The breakwater-curtain consists of a continuous, perforated, flexible curtain made of buoyant, strong and durable material, resistant to marine life, having the seaside end weighted to the floor of the sea, and having the landside end kept suspended at the required depth by a floater, anchored by a flexible cable in the sea bed. The suspended breakwater-curtain rises towards the land at an acute angle of not more than the angle of repose of fine sand. The groyne type of curtain is used as an adjunct to the breakwater-curtain and is adapted to control the long-shore drift of sediment on the sea side of the breakwater-curtain.

The flexible curtains are suitably made of nylon or fibre glass.

The greatest dimension of a perforation in the flexible curtain preferably lies in the range from 1/50" to 1", more preferably from 1/40" to 1/20". The area and number of perforations per unit area of the curtain preferably increases from the bottom towards the top.

The flapping flexible breakwater-curtain is pushed to the sea-floor by the pressure of each wave crest passing over it, allowing the suspended solid matter in the water to move towards the beach. However, when the trough of the wave passes over the curtain, it rises back to its original position. Long curtains should be fitted with additional small buoys at intervals in order to increase the speed of the rise. A horizontal vortex developing immediately on the landside of the curtain assists the floater in the lifting. In the progress of its oscillating movement, the curtain traps the sand carried back towards the sea by the off-shore current of the undertow. The undertow fills the space under the curtain with sand, thus establishing a permanent sand barrier, protected against the pressure of the waves by the curtain, and stabilised against the off-shore current by the internal friction of the sand. The size and shape of the perforations of the curtain vary with the grain size of the matter to be trapped and with the material of the curtain.

Within the area enclosed by the barrier, which is extended at both ends to the shore, the energy of the wave action progressively decreases and the possibility of the formation of long-shore and strong off-shore currents, called rips, is greatly reduced. The progression of storm waves from deep water over the barrier and the following shoaling beach will be a train of wave groups and broken wave flushes, until the beach foreshore is reached where the surge will percolate the beach crest. It is not expected for the barrier to absorb the wave energy as a breakwater, but to hold back and protect the sand bank and behind it the shallow bed of the dissipation basin from being depleted by the undertow, and the sand being washed back to greater depth where it would not affect the storm waves.

The groyne-curtain consists of a flexible mesh made of similar material as the breakwater-curtain, with the bottom end weighted to the sea-floor and the top end attached to a floater, holding the curtain suspended in a vertical position. The groyne-curtain oscillates with the wave. Storm waves might deflect it to the sea-floor. As the oncoming wave passes over the floater of the groyne, the hydrostatic pressure increases from the minimum at the trough to the maximum at the crest and the floater moves landwards, then the pressure decreases and the floater moves seawards. This swaying movement promotes the accretion of matter. The surface of the trough of a wave is approximately at one-third of its height below still water level. The floater of the groyne-curtain should be beneath trough level when in a vertical position.

In natural conditions it is only on odd occasions that the waves impinge squarely on a beach. Generally, the line of waves makes some angle to the contour lines of a shoaling beach. This increases the lateral dispersion of the surge resulting in a flat beach. The wave crests become curved in plan, and the angle between the waves and bottom contours becomes smaller as the waves approach the shore. This refraction of the waves and the subsequent direction of the general travel of the long-shore drift may be controlled by aligning groyne-curtains at normal position to the drift line, furthering thereby the formation of a higher beach.

The breakwater-curtain barrier should be located in a position approximately parallel and in-between the lines of the shore and the first major sand bank. Investigation for the positioning of the barrier should include inter alia— the most frequent wind directions, their maximum velocities and durations;
direction, depth and width of the long-shore currents caused by these winds;
the mode of sand movement, and the amount of sand transported by the currents along the coast;
length, amplitude, period, velocity and comparative energy of the waves caused by the design storms of varying direction;
survey of the profile of the sea bed extended to the second major sand bank.

From the survey, the grade of the general slope of the beach can be assessed. The grade of the beach depends on the grain size of its material. Shingle beaches are steeper than sand beaches.

Positioning of the barrier should generally satisfy the following conditions— the top of the barrier should be at or lower than the minimum depth of twice the amplitude of the design wave, beneath mean low water level;
a straight line drawn from the weight at the bottom end of the breakwater-curtain towards the shore at the assessed grade of the beach shall intersect the foreshore land at or above high water level.

The distance from the shore that a breakwater-curtain should be positioned is related to the selected length of the curtain and is thought to be inversely proportional to the surveyed slope of the sea-bed and directly proportional to twice the amplitude of the design wave.

Where excessive drag forces might be caused by major storms, the weight of the curtains should be protected by an additional anchorage attached to the weight and sunk into the sea-bed.

In case of a long-shore current with considerable amount of sand drift, it is possible to accelerate the accretion of sand by combining groyne-curtains with the breakwater-curtains of the barrier, by positioning the groyne-curtains at right angle to the current on the weather-side of the barrier. The sand accumulated by the current along the groynes will be transported over the barrier by the waves.

If the barrier and the dissipation basin behind it have failed to contain the energy of a storm wave, a recession of the beach crest line would appear. In such a case the barrier should be repositioned in seaward direction in order to ensure its efficiency against a similar storm of the same intensity.

Flexible curtain barriers and groynes may also be used to protect maritime structures like: dykes, sea-walls, harbours, etc. by developing dissipation basins in front of the structures. Navigational channels, harbour entrances might be kept free from becoming sanded up by aligning a series of groyne-curtains at right angle to the current, with part of their bottom removed, for the purpose of increasing the velocity and agitation on the sea-floor, thus preventing the depositing and assisting the transportation of the suspended matter in the current across the navigation channel.

Site reclamation along a protected shore may be carried out after the dissipation basin has been well established, and after it has been observed that landward winds have formed dunes of the excess sand behind the crest of the beach. In such a case the curtains of the barrier should be moved in a seaward direction to a distance equal with the width of the strip of land proposed to be reclaimed.

In order that the invention may be more readily understood reference will now be made to the accompanying drawings wherein.

Figure 1:
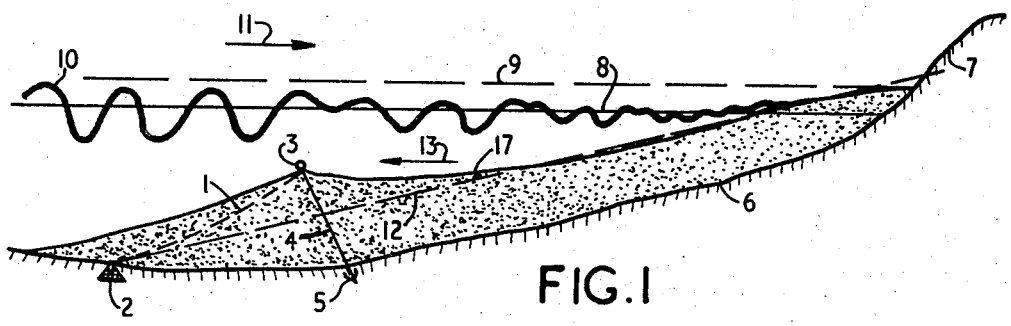
FIG. 1 is a view in vertical cross section of the breakwater-curtain according to the invention illustrating the details of the composing members and the preferred position of the barrier for efficient operation.

In FIG. 1 a vertical cross section of the system, the invention is shown as the breakwater-curtain. The flexible curtain 1 is secured to the sea-floor 6 by the weight 2 and kept in suspension at a grade of approximately 1 in 2 by the floater 3 which is held at the selected depth of twice the amplitude of the design wave beneath the mean low water level 8 by the flexible cable 4 secured to the bottom of the sea 6 by the anchorage 5. Position of the breakwater-curtain 1 is at such a distance from the shore 7 that a line 12 drawn across the weight 2 in the direction of the land at a grade parallel with a general slope of the sea-bed 6 shall intersect the foreshore 7 above the high water level 9. Waves 10 generated by the pressure of wind 11 mov the sand on the sea-floor 6 towards the shore 7. Under the pressure of the waves 10 the curtain 1 collapses in the direction of the wind 11 and the waves 10 pass over the curtain 1 without obstruction, carrying the sand into the dissipation basin 17. The off-shore current of the undertow 13, returning the said towards the sea, fills the space under the curtain 1 which has been raised back meanwhile by the floater 3 into its original position. The sand transported by the undertow 13 cannot escape towards the sea until such a stage when the dissipation basin 17 is filled with sand to its final capacity. At this stage the returning sand will pass over the established barrier to be deposited on the seaside of the curtain 1 during the end of the storm. FIG. 1 illustrates this stage of final development of the breakwater-curtain 1 barrier and dissipation basin 17, the object of the invention.

Figure 2:
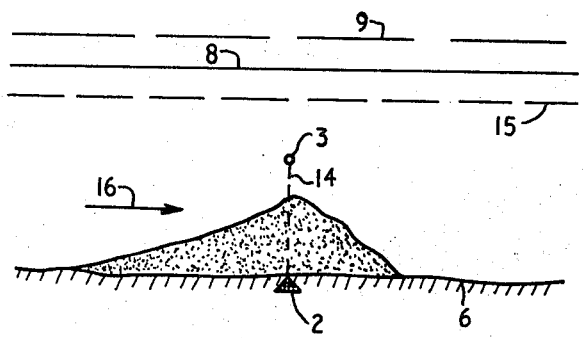
FIG. 2 is a view in vertical cross section of the groyne-curtain according to the invention illustrating the details of the composing members and the preferred position of the groyne for efficient operation.

In FIG. 2 a vertical cross section of the system, the invention is shown as the groyne-curtain. The flexible curtain 14 is secured to the sea-floor 6 by the weight 2 and is kept in a vertical position suspended by the floater 3. The floater, when in its highest position, should be beneath the trough level of the design wave 15. Sand transported by the long-shore current 16 is intercepted by the curtain 14 and forms deposits of varying heights along the groyne.

Figure 3:
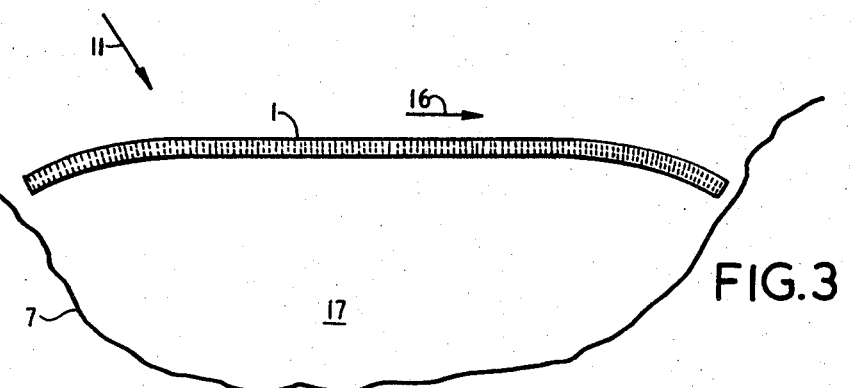
FIG. 3 is a view in plan of the barrier as formed by breakwater-curtains in a continuous row encompassing the dissipation basin in front of the shore to be protected.

In FIG. 3 a view in plan of the system, shows the general arrangement of the continuous row of breakwater-curtains 1 extended at both ends to the shore-line 7 forming the barrier which encompasses the dissipation basin 17 between the barrier and the shore 7.

Figure 4:
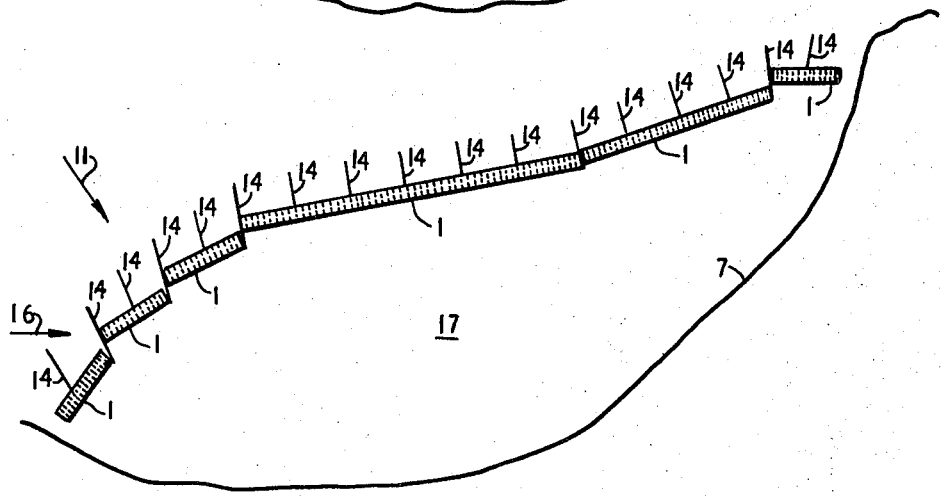
FIG. 4 is a view in plan of the barrier as formed by breakwater-curtains combined with groyne-curtains in a continuous row encompassing the dissipation basin in front of the shore to be protected.

In FIG. 4 a view in plan of the system, shows the general arrangement of the continuous row of a combination of breakwater-curtains 1 and groyne-curtains 14 extended at both ends to the shore-line 7 forming the barrier which encompasses the dissipation basin 17 between the barrier and the shore 7. The combination type barrier intercepts the sand transported either by waves 11 or by long-shore 16 along the coast.

What I claim is:

1. A method of controlling erosion or sedimentation caused by wave action wherein flexible perforated curtains have their bottom portions secured to the sea floor at a distance from shore by weights, a plurality of floaters are attached to the upper portions of said curtains so that their upper portions are at a minimum depth of at least twice the amplitude of the design wave passing over the curtain, and below the mean low water level, and the upper portion of said curtain is secured by anchor means whereby the curtains are collapsed by incoming waves, permitting sand and other sediment to be carried over said curtains, said floaters raising the curtains after passage of the waves so that sand and other sediment are trapped by the curtain as the undertow carries such sand and sediment offshore.

2. A method as claimed in claim 1, wherein the size of the perforations in the flexible curtains increase towards the top of the curtain.

3. A method as claimed in claim 1, wherein the greatest dimension of the perforations is in the range from $\frac{1}{60}''$ to $1''$.

4. A method as claimed in claim 1, wherein the greatest dimension of the perforations is in the range from $\frac{1}{40}''$ to $\frac{1}{20}''$.

5. A method of controlling erosion or sedimentation caused by wave action wherein a flexible perforated breakwater curtain has its bottom portion secured to the sea floor at a distance from shore by weights, a plurality of floaters are attached to the upper portion of said curtain and the upper portion of said curtain is secured by anchor means to the sea bed
    (a) so that the upper portion of said curtain is positioned at a minimum depth of at least twice the amplitude of the design wave passing over the curtains, and is positioned below the mean low water level;
    (b) so that an obtuse angle is formed by the curtain relative to the direction of approach of wave trains, with the curtain being collapsed by incoming waves, permitting sand and other sediment to be carried over said curtain; and
    (c) said floaters raising the curtain after passage of the waves so that sand and other sediment is entrapped in the acute angle formed by the flexible curtain and the sea bed as the undertow carries such sand and sediment offshore.

6. A method as claimed in claim 5, wherein the size of the perforations in the flexible curtains increase towards the top of the curtain.

7. A method as claimed in claim 5, wherein the greatest dimension of the perforations is in the range from $\frac{1}{60}''$ to $1''$.

8. A method as claimed in claim 5, wherein the greatest dimension of the perforations is in the range from $\frac{1}{40}''$ to $\frac{1}{20}''$.

9. A method as claimed in claim 5, wherein a plurality of flexible perforated breakwater-curtains are used, positioned end-to-end.

10. A method as claimed in claim 5, wherein in addition one or more flexible perforated groyne-curtains, their lower portions attached to weights and their upper portions to floaters, are used which are positioned:
    (a) approximately normal to, seaward and close to the position of the breakwater-curtain;
    (b) in such a manner relative to long-shore currents that they entrap sand or other sediment; and
    (c) so that their upper portions are beneath the trough level of the design wave, passing over the curtain.

References Cited
UNITED STATES PATENTS

| | | | |
|---|---|---|---|
| 1,748,444 | 2/1930 | Dutton | 61—3 |
| 3,161,026 | 12/1964 | Smedley | 61—3 |
| 3,333,420 | 8/1967 | Henson | 61—3 |

PETER M. CAUN, Primary Examiner